Aug. 3, 1954 F. T. BUDELMAN 2,685,648
APPARATUS FOR MEASURING FREQUENCY DEVIATION
Filed Aug. 18, 1948
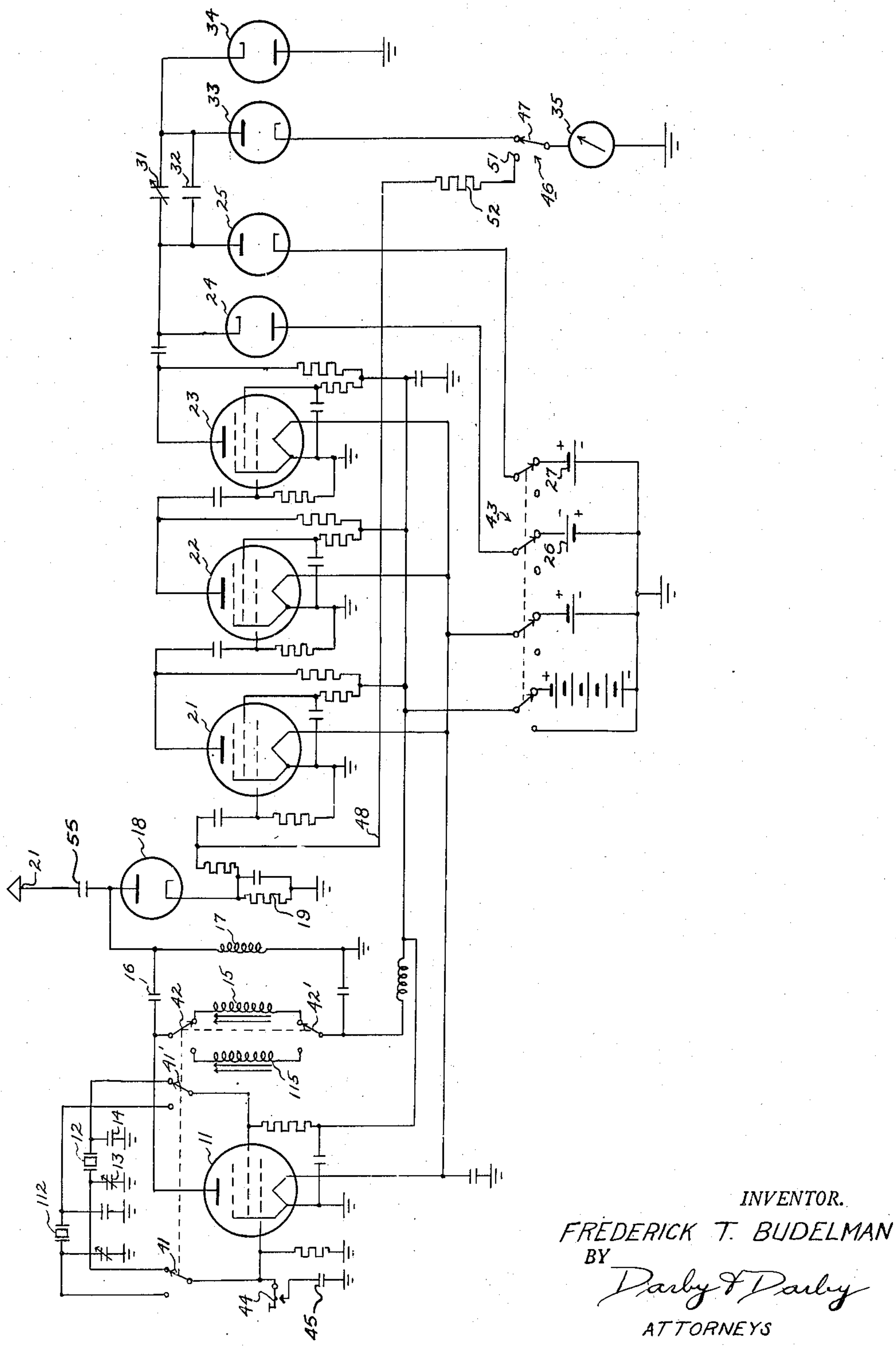
INVENTOR.
FREDERICK T. BUDELMAN
BY Darby & Darby
ATTORNEYS Patented Aug. 3, 1954 2,685,648

UNITED STATES PATENT OFFICE 2,685,648

APPARATUS FOR MEASURING FREQUENCY DEVIATION

Frederick T. Budelman, Little Falls, N. J., assignor to Link Radio Corporation, New York, N. Y., a corporation of New York Application August 18, 1948, Serial No. 44,895

2 Claims. (Cl. 250—39)

This invention relates to systems for determining the characteristics of a transmitted radio signal and particularly measurement of frequency deviation from a center frequency.

There has been a need to determine the deviations from center frequency of the carrier frequency of a signal transmission. In frequency or phase modulation systems the carrier frequency is varied in accordance with the modulating signal. In a frequency modulation system the carrier is varied by a fixed amount to either side of center frequency at a rate corresponding to the frequency of the modulating signal. In phase modulation the variation from center frequency is a function of the frequency of the modulating signal. In view of the fact that in frequency and phase modulation signals there is no deviation from center frequency unless there is a modulating signal, it has been difficult to determine readily and conveniently the frequency deviation due to the presence of the signal modulation.

Therefore, it is an object of this invention to provide a relatively simple, yet accurate and efficient system for determining the frequency deviation from a center frequency of a radio signal transmission.

It is another object to measure the amount of frequency deviation due to modulation of a frequency or phase modulated transmission.

It is a further object to provide apparatus which will permit frequency deviation measurements and at the same time, be adapted to incorporate as part thereof other signal characteristic measuring means.

Further objects will be apparent after a study of the following description, claims and drawings, in which—

The only figure is a circuit diagram of the electronic apparatus.

In accordance with this invention there is provided a local oscillator operating at a predetermined or selected frequency, a mixer and a detector for producing a beat note in accordance with the difference in frequency between an incoming signal and the local oscillator, an amplifying stage for amplifying the beat note, a limiter for limiting the amplitude to a constant level, a counter circuit providing output directly dependent upon a frequency of the beat note, and an indicating meter for indicating the output of the counter circuit.

Referring now in more detail to the drawing, it may be seen that there is provided an oscillator comprising a thermionic tube 11 having a crystal unit 12 connected between the grids thereof. Capacitors such as those indicated at 13 and 14 in the drawing are connected across the crystal unit 12, one of which may be variable as indicated. The local oscillator operates at a frequency, dependent upon and controlled by the characteristics of the crystal, which is at or near the center frequency of the incoming signal, to obtain a low audio frequency beat preferably zero, as compared to the frequency deviation to be measured. It will be apparent that it is not necessary to use a crystal controlled oscillator and that other oscillator circuits may be satisfactory.

In the tank circuit of the oscillator tube 11 there is a tunable inductance coil 15 coupled through a capacitor 16 and across a choke coil 17 to a detector 18. The inductance 15 is tuned for maximum output at the oscillator frequency or a multiple thereof. The coil 17 is a high impedance choke for high frequencies and is connected to ground. An antenna 21 is connected through a capacitor 55 to the detector 18. Here the incoming or received signals from the antenna are mixed with the local oscillator signal.

The detector 18 may be normally and preferably a thermionic diode tube although it will be apparent that other types may be used. The output of the detector across the diode load circuit 19 is coupled to the input grid of an amplifying tube 21.

In the particular embodiment of the invention illustrated, the output from the detector is amplified by three resistance coupled amplifying stages comprising three tubes identified by the reference characters 21, 22, and 23. Other circuits which will amplify the beat frequencies may be used. These three stages may also act as limiters in the presence of a strong signal.

The output from the amplifying stage which in this case is the output from the third tube 23 is connected through a capacitor to rectifier units 24 and 25 for clipping or limiting action to limit the amplitude of the amplified beat note to a constant level. These rectifying units 24 and 25, as may be seen, are connected in opposite polarity so as to provide full wave action. Each unit is connected to a source of suitable biasing potential such as batteries 26 and 27 respectively. As before, thermionic diode tubes may be preferred, however, it will be apparent that other limiter circuits may be used.

The limiters 24 and 25 are coupled through capacitors 31 and 32 to a second pair of detector units 33 and 34. One capacitor may be variable.

The detector units 33 and 34, which, again, may be thermionic diode tubes by preference, are connected in opposite polarity to ground. This arrangement provides a counting circuit responsive to the frequency of the beat note produced by mixing the incoming signal with a local oscillator. A suitable meter 35 is connected in the counting circuit to provide a direct indication of the output from the detector unit and thus provide a direct indication of the frequency difference between the local and incoming signals. In the particular form shown, meter 35 is connected between detector unit 33 and ground. The detector units 33 and 34 provide full wave rectification.

With this circuit arrangement the predetermined or desired center frequency is established by the local oscillator controlled by the crystal unit 12. The output of the local oscillator is mixed with the signal received by the antenna 21 and the mixed signal is detected by the detector 18 and fed to the amplifier. When the signal carrier is modulated, various other beat notes are generated between the output of the local oscillator and the side band of the frequency or phase modulated signal. The resulting amplified beat notes are subjected to the limiting action of the full wave detectors 24 and 25 and fed to the counting circuit comprising the detectors 33 and 34. The frequency deviation of the incoming signal on antenna 21, from the center frequency determined by the local oscillator, will determine the beat frequencies. The output of the counter circuit is directly related to the amount of frequency deviation and indicated by the meter 35. Thus the indication of frequency deviation of the carrier frequency is substantially independent of the modulating frequency.

It will be apparent that the circuit described may accommodate more than one local oscillator or center frequency. Thus, as shown in the drawing, by suitable switching arrangement a second crystal unit 12 may be connected across the grids of the oscillator tube 11 alternately with the crystal unit 12 by operation of the switches 41 and 41'. The coil 115 may be substituted for the coil 15 by operation of the switches 42 and 42'. The switching units 41, 41', 42, and 42' may be ganged so that with a single operation the frequency of operation of the local oscillator is changed. Additional oscillator frequencies may be obtained, limited only by practical structural considerations. In this way, the unit may be adapted to measure the frequency deviation of different incoming frequency modulated signals operating at different carrier frequency centers. In each instance, beat notes are produced and the deviation may be indicated by the meter 35. Again it will be apparent that other oscillator circuits may be used and not necessarily crystal units.

A power switching unit 43 may be used to simultaneously connect the various power supplies for operation of thermionic tubes and their bias voltages.

In the event that a carrier frequency is being received which differs from the predetermined center frequency, but which side of center is not known, the polarity or direction of the difference in frequency may be determined by adding a deviation polarity switch 44. The deviation polarity switch 44 as may be seen, is connected from the grid of the oscillator tube 11 through a capacitor 45 to ground. This switch 44 is normally maintained open but may be closed momentarily to shift the oscillator frequency slightly, alter the beat note and determine the polarity of deviation of the incoming frequency from center frequency.

Additional characteristics of the incoming signal may be determined conveniently and readily by providing an additional switching unit 46. Thus, for instance, a lead 48 may be connected to the output of the detector 18 through a suitable resistor 52 to a terminal 51 on the switching unit 46. When the switching arm 47 is connected to the terminal 51 the meter 35 will read the R.-F. input signal strength.

It will be obvious that the meter 35 may be connected through the switch 46 to additional contacts which may be provided if desired for measuring voltages such as battery voltages for instance, if the unit is made portable and battery power supplies are used.

The system in accordance with this invention may have further uses, such as, for instance, a frequency modulation detector, due to the fundamental characteristic of producing an output current or voltage which is proportional to frequency swing but independent of modulating frequency.

The particular embodiment is for illustrative purposes only. Modifications will be apparent to those skilled in the art without departing from the scope of the invention. In the claims, the term "frequency modulated signal" means frequency or phase modulated signals.

What is claimed is:

1. A radio system comprising means for receiving a frequency modulated signal, a local source of constant frequency signals, a mixer circuit for beating the output of said local source with the received frequency modulated signal, a frequency counter circuit having an output dependent upon the resultant beat frequency, a reactance, and a deviation polarity switch for selectively connecting said reactance to said local source to alter the frequency thereof thereby to determine the polarity and direction of difference in frequency between said received signal and said local source.

2. A system for measuring frequency deviation of an incoming frequency modulated signal from center frequency comprising a local source of electrical energy operating at constant center frequency, means for receiving said incoming frequency modulated signal, a mixer and detector circuit connected thereto for mixing said local electrical energy with said incoming signal and producing an audio beat frequency, a circuit connected to said mixer for amplifying said audio beat frequency, a limiter circuit connected to said amplifying circuit to maintain the amplitude of the output thereof at a constant level, a frequency counter circuit connected to said limiter circuit having an output dependent upon the beat frequency, a meter connected to said counter circuit and providing a direct linear average reading of the output thereof, and a deviation polarity switch and a reactance connected to said local source, to change selectively the frequency thereof for determining the direction of difference in frequency between said incoming signal and said local source.

References Cited in the file of this patent

UNITED STATES PATENTS

| Number | Name | Date |
|---|---|---|
| 1,944,315 | Clapp | Jan. 23, 1934 |
| 2,228,367 | Sanders | Jan. 14, 1941 |
| 2,261,272 | Newhouse | Nov. 4, 1941 |
| 2,282,092 | Roberts | May 5, 1942 |
| 2,309,481 | Summerhayes | Jan. 26, 1943 |
| 2,323,956 | Yerian | July 13, 1943 |
| 2,324,077 | Goodale et al. | July 13, 1943 |
| 2,337,328 | Hathaway | Dec. 21, 1943 |
| 2,419,527 | Bartelink | Apr. 29, 1947 |
| 2,491,494 | Grimm | Dec. 20, 1949 |